(No Model.) 2 Sheets—Sheet 1.

W. S. MORDEN.
MACHINE FOR CUTTING CORN.

No. 440,049. Patented Nov. 4, 1890.

Witnesses.
W. L. Boyden
J. Wm. Waple

Inventor.
William S. Morden
per John C. Tasker Atty.

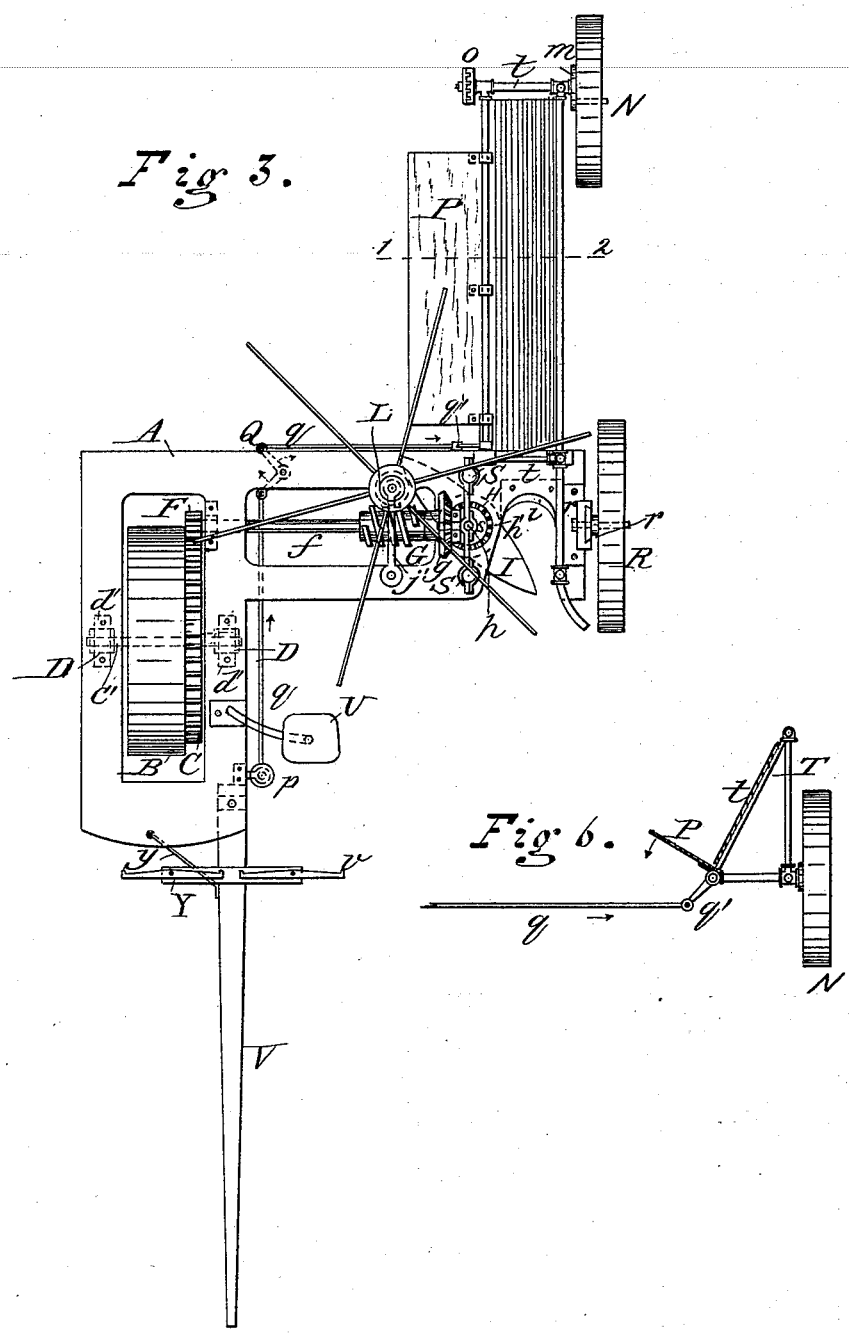

UNITED STATES PATENT OFFICE.

WILLIAM S. MORDEN, OF MONTAGUE, MICHIGAN, ASSIGNOR OF ONE-HALF TO RALPH HOFFMAN, OF SAME PLACE.

MACHINE FOR CUTTING CORN.

SPECIFICATION forming part of Letters Patent No. 440,049, dated November 4, 1890.

Application filed August 3, 1889. Serial No. 319,638. (No model.)

*To all whom it may concern:*

Be it known that I, WILLIAM S. MORDEN, a citizen of the United States, residing at Montague, in the county of Muskegon and State of Michigan, have invented certain new and useful Improvements in Machines for Cutting Corn, &c.; and I do hereby declare the following to be a full, clear, and exact description of the invention, such as will enable others skilled in the art to which it appertains to make and use the same.

This invention relates to an improvement in that class of machinery used for cutting corn, ensilage, cane, or other cereals and grains while they are growing in the fields, the object being to substitute mechanical for manual labor, and to provide a machine whereby the corn or other field product may be effectually cut and deposited in a dumping-trough until a bundle thereof of sufficient size has been formed, which may then be transferred by the operator to the ground, thus saving the great expenditure of physical labor which attends the cutting of the corn by hand, besides hastening the work and helping in various other ways.

The invention consists in a locomotive-machine adapted to be propelled over the fields by horse or other power. The mechanism of the machine derives its power from one or more drive-wheels.

The devices which constitute the machine comprise, essentially, a horizontal rotary cutter constructed with one or more knives and cutting against a fixed knife on the framework of the machine; also, a series of arms secured to a disk or hub traveling at a much less speed than the travel of the knives, said arms being capable of adjustment on a vertical shaft to suit the different heights of the stock to be cut. These revolving arms lay hold of the upper ends of the corn or other stock, gradually depressing them and depositing said stock in the aforesaid trough. The main portion of the machine that carries the knives is also capable of being raised or lowered to adapt the machine to the unevenness of the surface of the soil.

The invention further consists in certain peculiarities in the construction, arrangement, and combination of the several parts of the machine, substantially as will be hereinafter fully described, and then more particularly pointed out in the appended claims.

Figure 1:
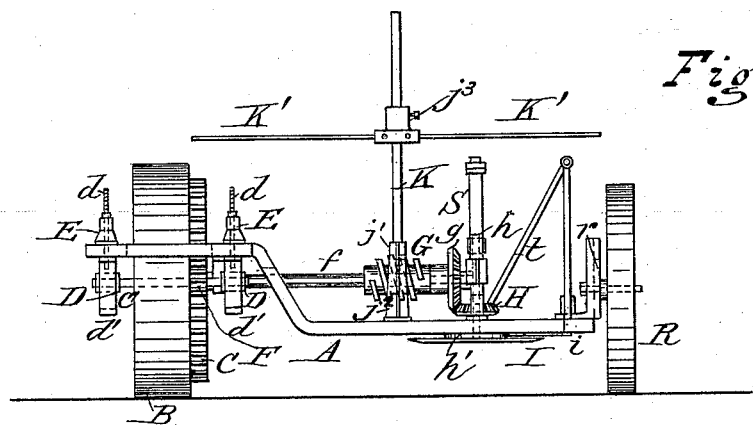
Figure 5:
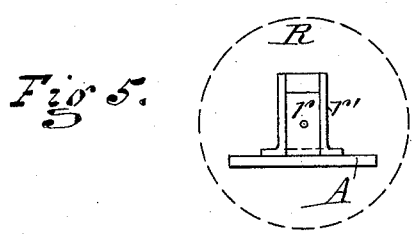
Figure 4:
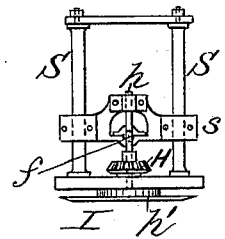
Figure 2:
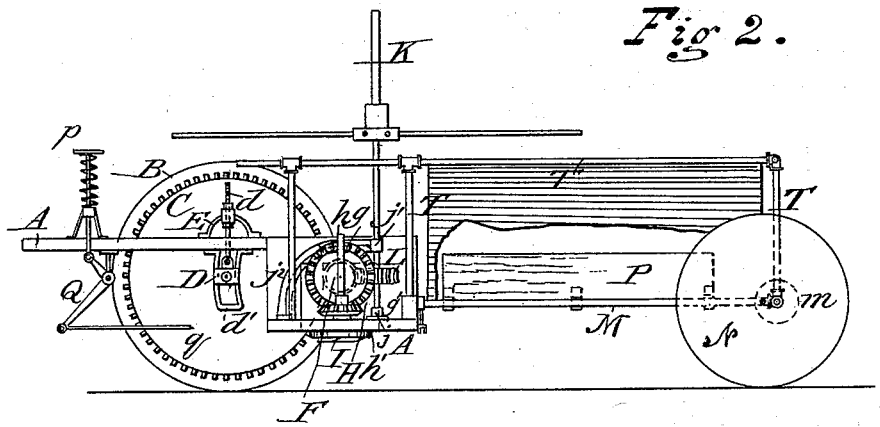

In the accompanying drawings, illustrating my invention, Figure 1 is a front elevation of the machine with the rear portion of the frame and the trough removed. Fig. 2 is a side elevation with certain parts removed. Fig. 3 is a plan view of the entire machine with part of the drive-wheel-adjusting devices removed. Fig. 4 is a detail view of the standards and brackets for journaling the ends of the shafts. Fig. 5 is an elevation of the grain-wheel and movable slide. Fig. 6 is a cross-sectional elevation on line 1 2 of the trough.

Like letters of reference designate like parts throughout all the different figures.

A denotes the main frame of the machine, which is preferably made of light iron casting, but can be made of gas-pipe or hard wood, if desired. It is preferably of the general form shown in Figs. 1 and 3, although it may be of any convenient form to permit the proper arrangement therein and therewith of the several mechanical parts of the machine. The form of this frame is such, as will be seen by inspecting Fig. 1, as to enable the cutters to reach close to the surface of the soil.

B represents the main driving-wheel which travels upon the surface of the field and serves to propel the machine and also to transmit power to drive the mechanism of which the machine is composed. Secured to one side of the drive-wheel B is the gearwheel C. The wheel B and its connected gear are firmly fastened upon the shaft C', which is journaled in the movable slide-boxes D D. These slide-boxes are carried in the slides $d'$ $d'$, which are firmly fastened to the main frame A. To the upper portions of the boxes D are pivoted the bolts $d$ $d$, which pass through the curved standards E, fastened on the upper side of frame A, said bolts $d$ $d$ being furnished with nuts above and below the standard for the purpose of holding the bolts in any desired position of adjustment. By adjusting these bolts the slide-boxes can be located in different positions, and consequently the drive-wheel B and its shaft may have their positions changed relatively to the frame, as may be desired. The slides $d'$ $d'$ have a curvature with a radius equal to the radius between the center of the driving-wheel and the pinion F. This pinion is secured to the shaft $f$ and engages the gear-wheel C, by which it is driven, said shaft $f$ being properly journaled in boxes fastened in the frame. On this shaft $f$ is also a worm G, and also it carries at its end a bevel gear-wheel $g$. Adjacent to said bevel-gear $g$ is the short vertical shaft $h$, carrying the bevel-pinion H, securely fastened thereto and located close to the upper surface of the depressed portion of the main frame, as best seen in Fig. 1. The pinion H is engaged by the bevel-gear $g$. On the vertical shaft $h$, directly below the frame A, is fastened the collar $h'$, to which are attached the horizontal knives or cutters I, of which there may be any number, one or several. Experience will dictate the proper number. The shaft $h$ is properly journaled in the frame and in an upper box. The arrangement of this shaft is most clearly and fully shown in Fig. 4. It will be clearly observed that the rotation of the shaft $f$, consequent upon the forward motion of the machine, will serve to transmit power to actuate the knives I I. Adjacent to these knives is a fixed knife or steel plate $i$, securely fastened to the under side of the frame at the point where the frame is cut with a rounded throat or notch, as seen in Fig. 3, the fixed plate being likewise so arranged that during the movement of the knives they will come into close relation with the plate $i$, and hence the corn or other stock which enters the hollow in the frame will be caught between the knives and the steel plate and the stock will be at once cut. The fixed plate projects sufficiently past the edge of the frame to allow of a good cutting-edge. Instead of the knives a circular saw may be used, if desired.

K denotes an upright shaft having its lower end journaled in a box $j$ on the frame A, which box forms a cup-bearing for the shaft. The shaft is journaled above in a bearing $j'$ on the end of the bracket $j^2$, which is fastened to the frame A and straddles the worm G, as shown. Above the bracket this shaft is preferably made square. It extends upward the desired height to permit the arms to operate so as to suit the longest stock to be cut. On this square shaft is a loose hub $j^3$, in which are fastened a series of arms K', preferably six in number, although there may be any number of them. The hub is adjustable upon the shaft and may be held at any desired height by means of the set-screw with which it is provided. Motion is communicated to this shaft by the worm-wheel L, (see Fig. 2,) secured thereon and engaging with the worm on the main driving-shaft $f$. In this way we secure a slow motion of the arms, while the knives revolve at a rapid speed.

In the rear portion of the machine is an elongated rectangular frame-work M, made, preferably, of pipe and securely fastened to castings which are bolted to the main frame. In the extreme end of the frame is a shaft provided with a disk $m$, on which disk is fastened the pin for carrying the rear wheel N. The distance from the center of this disk $m$ to the center of the pin is equal to half the height to which the main frame can be raised or lowered. The opposite end of this shaft is provided with a clutch O, (see Fig. 3,) one-half of which is loose and fits on a square part of the shaft, while the other half is formed as a part of the frame. When the wheel N is to be raised or lowered, the clutch is disengaged, the wheel properly adjusted, and the loose half of the clutch is then inserted into the solid part and held in place by a nut on the end of said shaft. On this frame is arranged the leaf P. Fig. 6 shows more clearly the relative position of the leaf to the frame. The stock is cut and carried by the machine until a bundle of sufficient size is obtained. When the operator by the action of his foot depresses the treadle $p$, located near the forward end of the machine, and by an arrangement of right-angled levers Q and connecting-rods $q$, which connect with the lever $q'$, that is attached to the leaf P, said leaf is lowered into nearly a perpendicular position and the bundle of corn is deposited on the ground, this leaf P, together with the sheet-iron plate, hereinafter referred to, forms a dumping trough or receptacle.

R denotes one of the wheels of the machine, located opposite to the main driving-wheel B. The carrying-pin of this wheel is fastened to a sliding block $r$, for the purpose of raising and lowering this wheel, said sliding block being carried in a casting $r'$, which is fastened to the frame and is secured in position thereto by means of a nut on the back of the casting. (See Fig. 5.)

S, Fig. 4, shows an arrangement of standards fastened to the frame, to which is secured the bracket $s$, which carries the ends of the upright and horizontal shafts. The plan view of this arrangement shows more clearly in Fig. 3.

T is a system of upright and horizontal pipes fastened to the frame and carried at any desired height, so as to act as a guard for the stock while being carried to the trough.

$t$ denotes two pipes connected to the horizontal pipe T on the upper end and to the inner pipe of the frame M. Fig. 6 shows this pipe placed at an angle. This pipe acts as a brace and supports the outer end of the frame M, and the space between the two pipes $t$ on the angle will preferably be filled in with sheet-iron, so as to enable the stock after being cut to slide easily down into the trough.

U, Fig. 3, represents the seat for the driver, V the tongue, $v$ the whiffletree, and Y the evener.

$y$ is a brace to fasten the tongue to the frame.

A saw may be used oftentimes as a cutter instead of the knives herein described.

Having thus described my invention, what I claim as new, and desire to secure by Letters Patent, is—

1. The combination of the main frame, the driving-wheel B on shaft C', the slide-boxes D D, in which the shaft C' is journaled, the slides $d'$ $d'$ for said boxes, said slides being firmly fastened to the main frame, said slides having a suitable curvature, the adjusting-bolts $d$ $d$, pivoted to the upper portions of the boxes D and passing through the curved standard fastened on the upper side of the frame, together with the wheel R, its slide-block $r$ and slide $r'$, and suitable cutting devices arranged within the machine, substantially as described.

2. The combination of the main frame, the driving-wheel B on shaft C', the sliding boxes D D, in which the shaft C' is journaled, the slides $d'$ $d'$ for said boxes, said slides being firmly fastened to the main frame and having a suitable curvature, the adjusting-bolts $d$ $d$, pivoted to the upper portions of the boxes D and passing through the curved standards fastened on the upper side of the frame, the wheel R, its slide-block $r$ and slide $r'$, the vertical shaft $h$, carrying the bevel-gear H and having thereon the collar $h'$, to which the knives I I are attached, said gear H engaging the bevel-gear $g$, the upright shaft K, having thereon a loose hub provided with a set-screw, together with the series of arms K', attached to said hub, and a worm-wheel L on the said shaft, engaging with the worm on the main driving-shaft, substantially as described.

In testimony whereof I affix my signature in presence of two witnesses.

WILLIAM S. MORDEN.

Witnesses:
V. O. CLINGER,
C. L. STRENG.